United States Patent
Moore (10) Patent No.: US 7,325,516 B2
(45) Date of Patent: Feb. 5, 2008

(54) MOBILITY ASSISTANCE VEST FOR THE LAME OR ELDERLY ANIMAL

(76) Inventor: Sarah Anita Moore, 5965 S. Ridge Rd., Madison, OH (US) 44057-9741

( * ) Notice: Subject to any disclaimer, the term of this patent is extended or adjusted under 35 U.S.C. 154(b) by 0 days.

(21) Appl. No.: 11/332,426

(22) Filed: Jan. 13, 2006

(65) Prior Publication Data

US 2006/0156997 A1    Jul. 20, 2006

Related U.S. Application Data

(60) Provisional application No. 60/643,986, filed on Jan. 15, 2005.

(51) Int. Cl.
*A01K 13/00* (2006.01)
(52) U.S. Cl. .................. 119/850; 119/497; 119/907; 119/856; 119/792; 119/725; 119/714; 119/712; D30/151; D30/144; 54/79.2
(58) Field of Classification Search ........ 54/79.1–79.4; D30/151, 152, 144, 145; 119/850, 712, 714, 119/725, 769, 770, 792, 793, 856, 857, 907, 119/702, 497, 728, 858–865
See application file for complete search history.

(56) References Cited

U.S. PATENT DOCUMENTS

| 742,285 | A | * | 10/1903 | Bulles | 54/79.2 |
| 784,921 | A | * | 3/1905 | Clemetson | 54/79.2 |
| 805,925 | A | * | 11/1905 | Meyers | 54/79.2 |
| 1,015,239 | A | * | 1/1912 | Miller | 119/725 |
| 4,537,154 | A | * | 8/1985 | Kay | 119/857 |
| 4,644,902 | A | | 2/1987 | Doyle | 119/19 |
| D290,178 | S | * | 6/1987 | Nissen | D30/109 |

(Continued)

FOREIGN PATENT DOCUMENTS

GB        2184091 A  *  6/1987

OTHER PUBLICATIONS

"ComfortLift Carrier", Doctors Foster & Smith catalog, p. 151, 2004.

(Continued)

*Primary Examiner*—Andrea M. Valenti
(74) *Attorney, Agent, or Firm*—William N. Hogg; Driggs, Hogg & Fry Co., LPA (57) ABSTRACT

A mobility assistance vest can be easily donned by placing the vest inside up under the dog, then pulling the right and left side sections together over the top line fastening the Velcro strips, and then pulling the chest section by the front shoulder straps through the front legs and securing the shoulder straps to the side sections on either side of the neck. The semi-detachable handle straps at the front legs are then crossed to the opposing side and attached with a snap to D-rings on the shoulder handles for the human handler to provide counter weight or upward support as they both descend the stairs side by side. Alternatively, the detachable handle straps at the front legs can be attached with the snap connector to the D-rings on the rear section of the vest to provide support for assisting the canine while ascending stairs, walking and standing up.

1 Claim, 6 Drawing Sheets

U.S. PATENT DOCUMENTS

| | | | | |
|---|---|---|---|---|
| 4,715,618 A | | 12/1987 | Harris | 280/801 |
| D312,151 S | | 11/1990 | Dickey | D30/145 |
| 5,193,486 A | * | 3/1993 | Kitchens | 119/725 |
| 5,443,037 A | | 8/1995 | Saleme | 119/771 |
| 5,632,235 A | * | 5/1997 | Larsen et al. | 119/856 |
| D379,686 S | | 6/1997 | Caditz | D30/145 |
| 5,713,308 A | | 2/1998 | Holt, Jr. | 119/856 |
| 5,738,043 A | * | 4/1998 | Manuel | 119/497 |
| 5,913,285 A | | 6/1999 | Pritchard | 119/771 |
| 5,915,335 A | | 6/1999 | Holt, Jr. | 119/771 |
| 5,996,537 A | | 12/1999 | Caditz | 119/850 |
| 6,123,049 A | | 9/2000 | Slater | 119/850 |
| 6,138,611 A | | 10/2000 | Thielemann | 119/850 |
| D445,547 S | | 7/2001 | Howitz et al. | D30/145 |
| 6,595,162 B1 | * | 7/2003 | Hibbert | 119/850 |
| 6,694,921 B2 | | 2/2004 | Emerick | 119/725 |
| D507,084 S | * | 7/2005 | Sabeh-Azar | D30/199 |
| D510,160 S | * | 9/2005 | Rominger | D30/199 |
| 7,004,922 B1 | * | 2/2006 | Shesol | 602/79 |
| 2003/0200937 A1 | * | 10/2003 | Muckleroy | 119/497 |
| 2005/0229869 A1 | * | 10/2005 | Leo | 119/850 |
| 2005/0263102 A1 | * | 12/2005 | Sherman et al. | 119/792 |
| 2006/0037562 A1 | * | 2/2006 | Woerner | 119/856 |

OTHER PUBLICATIONS

"Warming Pet Wrap", Doctors Foster & Smith catalog, p. 150, 2004.
"Pendleton Dog Jacket", LL Bean catalog, p. 56, 2004.
"Turnout Dog Blanket", Dover Saddlery catalog, p. 218, 2004-2005.
"Combination Front and Back Harness", HandicappedPets.com, pp. 1-3, Dec. 7, 2004.
"Pet Lift, Front and Back Pet Lift", HandicappedPets.com, p. 1, Dec. 7, 2004.
"Four Paws Safety Seat Support Harness", AllPetsConsidered.com, p. 1, Dec. 7, 2004.
"Lift-n-Aid™ Dog Harness", Shop.Com, p. 1, Dec. 7, 2004.
Deluxe Ripstop Chest and Body Protector, Cabela's Master Catalog, pp. 506 and 507, 2005.

* cited by examiner

MOBILITY ASSISTANCE VEST FOR THE LAME OR ELDERLY ANIMAL

FIELD OF THE INVENTION

This invention relates generally to an animal harness for increased mobility, and more particularly, to a canine vest that can be worn comfortably all day optionally with handles for a human handler to use in assisting the mobility of the canine as needed to descend stairs, ascend stairs, walk, and stand.

BACKGROUND OF THE INVENTION

By Jan. 17, 2004, the family dog is twelve and one-half years old. Our yellow Labrador, Missi, has been experiencing a decline in mobility since she was eight years old. For the past two years, she is unable to negotiate stairs. My husband has been carrying her down in the morning and up in the evening and we block the stairs during the day. Fortunately, my husband is physically able to carry an 85-pound dog up and down stairs. Not all households are that fortunate. I know of one person that had to walk and rub their elderly dog for 15 minutes at the top of the stairs before he would allow the dog to attempt going down. I know of another person that is sleeping downstairs with their pet because she does not want the pet to feel dejected, as it cannot make it up and down the stairs. Another person hangs onto their dog's collar in precarious positions hoping for a safe landing. Others having experienced dangerous incidents that lead the owner not to allow the dog to go upstairs with the family. Products on the market only assist with walking, standing, and going upstairs. While considering the unanswered, longstanding need to assist an elderly dog downstairs, I designed a very secure dog vest that allows the owner to stabilize and support some of the dog's weight as they both descend the stairs side by side. The vest is also useful for assisting the elderly or injured dog in standing up, walking, and performing other outdoor duties.

DESCRIPTION OF THE PRIOR ART

Prior Art research does not produce a product that encompasses the same purpose as the present invention. Assisting the mobility of a dog going downstairs requires a very strong, secure design that has not been claimed until the present invention. Prior art research does not produce a vest design with undercarriage support or a secure, non-slip ribcage enclosure as comfortable and as easy to install as the present invention because the present invention does not require the threading of limbs through holes.

The Warming Pet Wrap, All Purpose Dog Coat, U.S. Pat. No. 5,996,537, Dog Coat, U.S. Pat. No. 6,138,611, Pendleton Dog Jacket, and Turnout Blanket do not claim to assist a pet's mobility. The coats only claim to be ornamental, warmth enhancing, reflective, or brush protective. The coats could not support or distribute the pet's weight as the design either does not have an underside or is fastened in areas that would be compromised or dangerous if upward pressure is applied. The coats do not include any form of handles in the design.

The Pet Carrier, U.S. Pat. No. 4,644,902, has awkward leg holes in a sling and is proposed only to carry very small pets or infants.

The Four Paws Safety Support Harness and Dog Car Restraint, U.S. Pat. No. 5,915,335, are mainly proposed to restrain pets during transportation or walking and their designs do not adequately distribute weight causing pressure points rather than even comfortable support.

The Bullet Proof Canine Vest, U.S. Pat. No. 6,123,049, is proposed to provide ballistic protection and repelling support through many straps holding the coat in place. The design does not include handles for human assistance and requires the threading of limbs through the vest for installation.

The Comfort Lift Carrier and Dog Assist Harness, U.S. Pat. No. 6,694,921, does not claim to assist a pet going downstairs, as the sling design is not secure to the animal and slips to the hindquarters, rendering it useless or even dangerous for this application.

The Combination Front and Back Harness and Pet Lift are cumbersome to dress the dog since the animal has to be on its back to get the limbs through the holes. The Combination Harness requires both hands of the handler which can only be practical for very short distances since the human is virtually walking sideways. The Front Harness restricts limb movement with limb holes and does not extend to support the full ribcage area. The Pet Lift material is stretchy which is not safe for going downstairs, and handles apply undue pressure to the abdominal area where vital organs are not protected by the ribcage.

The Dog Lift-N-Aid Mobility Harness is not designed to go downstairs, only upstairs. Going downstairs with this harness would be uncomfortable for the animal since the shoulder webbing straps do not adequately distribute weight and it would be very dangerous as the plastic buckles can break or the straps lose position, causing the animal to slip through.

SUMMARY OF THE INVENTION

It is an object of the invention to assist the mobility of an injured, lame, recovering, or arthritic elderly dog or other quadruped animal that has difficultly carrying its own weight. The objective of the mobility vest is to improve the quality and longevity of the animal's life by allowing the owner to assist when the animal's ability to move is painful or compromised. It is an object of the invention to provide mobility assistance, not only for walking, standing, and going upstairs, but also to assist going downstairs.

It is an object of the invention to provide a vest design that can be quickly installed, but also comfortable enough to be worn throughout the day under human supervision for immediate assistance. An additional object of the vest design is to be secure, maintaining its position during use, and provide support that is spread throughout the chest, ribcage, and spine.

A further object of the invention is to provide the human with one hand access to support the canine's weight from various attachment points to the vest that best support the canine for the chosen activity.

The vest can be quickly installed because it is fitted in just a few quick motions with Velcro, RTM closures and the design works around limbs and does not require the threading of limbs through holes, which is important for a dog that needs support in the first place. The vest materials are breathable and lightweight so that the vest could remain on the pet all day under human supervision. An extra lining can be added for extended periods outside in the cold. Maintaining mobility is medically recommended for arthritic pets and it keeps the pet's spirits up.

The human handler can provide counter weight or upward resistance through the handles to support a portion of the dog's weight. The handle straps positioned at the front legs and rear chest provide support throughout the pet's whole ribcage which, in turn, supports the spine for assistance in going upstairs, walking, stabilizing during outdoor duties, and standing up from a seated or lying down position. The handle straps positioned at the front legs and the shoulders provide secure chest support for going downstairs. The vest stays securely in place with Velcro, RTM and metal hardware connectors to handles with no risk of sliding backwards while going downstairs or walking. The wide shoulder straps provide control and stability throughout the chest with no pressure points, and the cross bracing of webbing straps help distribute weight throughout the entire vest.

The present invention achieves its object results with the following key design features and is also set forth in the references to the accompanying drawings.

BRIEF DESCRIPTION OF DRAWINGS

FIGS. 4a-4p diagram several alternative handle configurations from the top-view.

DESCRIPTION OF THE PREFERRED EMBODIMENT(S)

Figure 1:
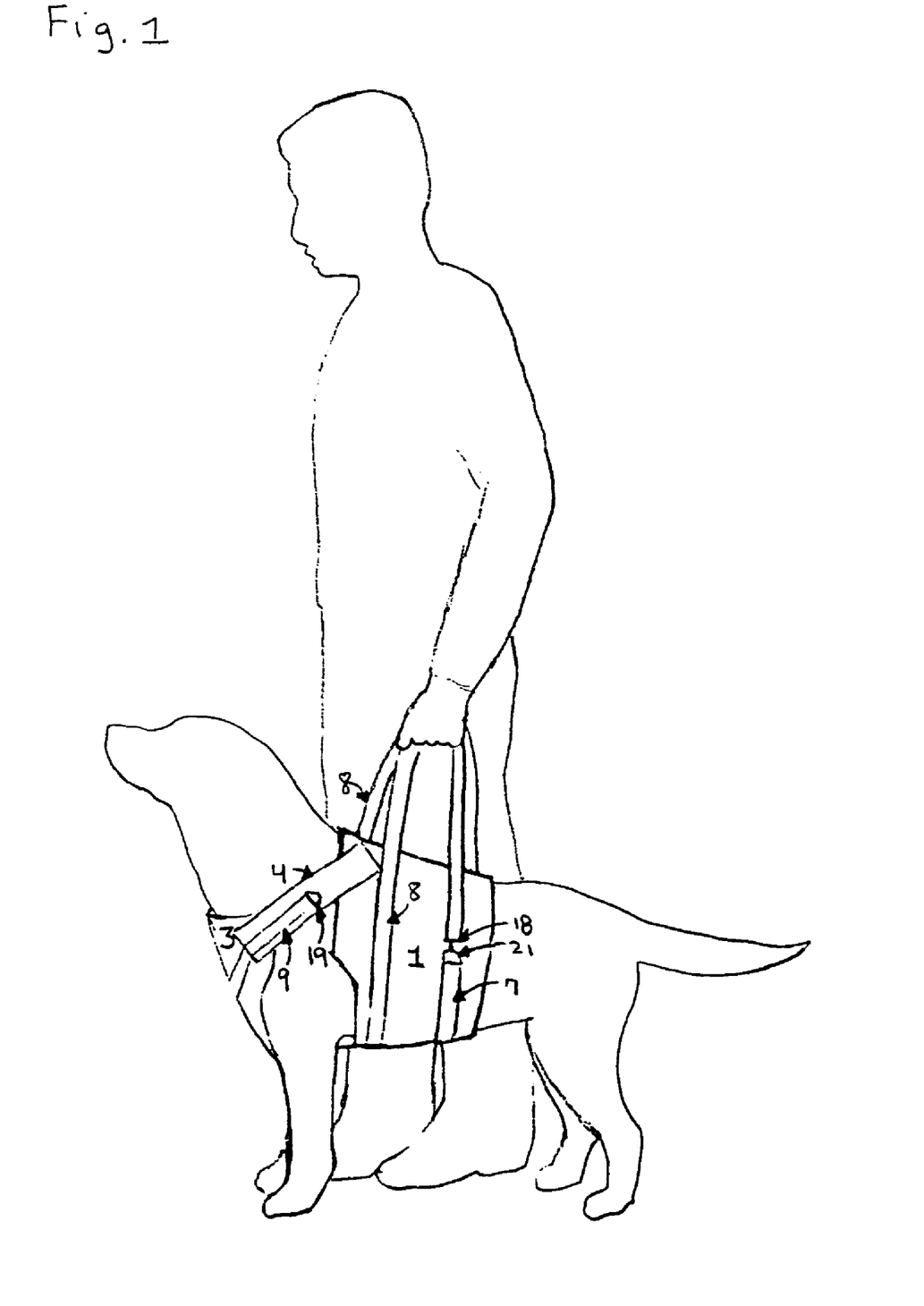
FIG. 1 shows a dog wearing the vest with the handle straps in the rear position for walking.
Figure 2:
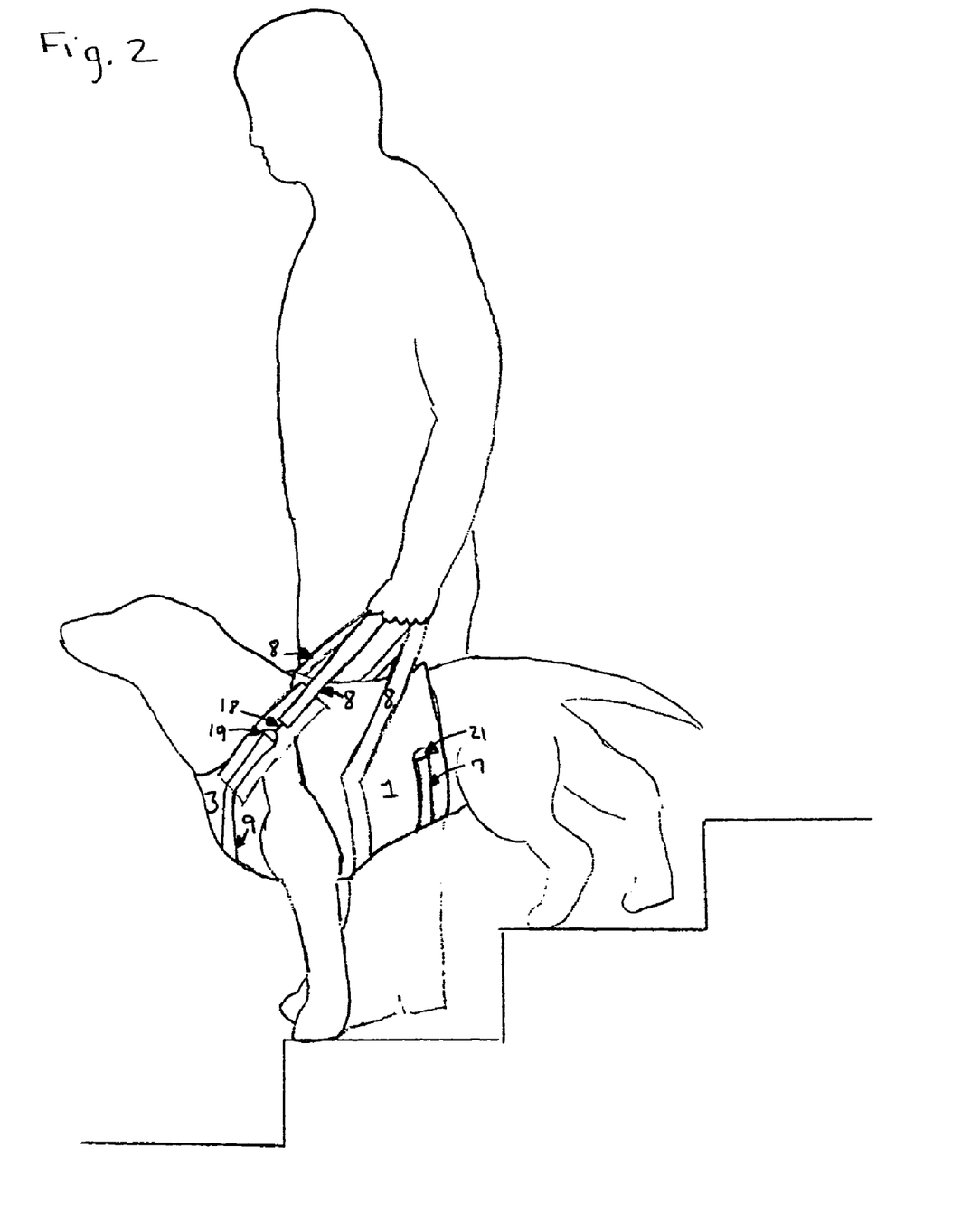
FIG. 2 shows a dog wearing the vest with the handle straps in the forward position for going downstairs.

FIGS. 1 and 2 demonstrate how a vest fits the dog, where the handler is positioned, and how the handles are changeable from a forward to rear position for different uses.

Figure 3:
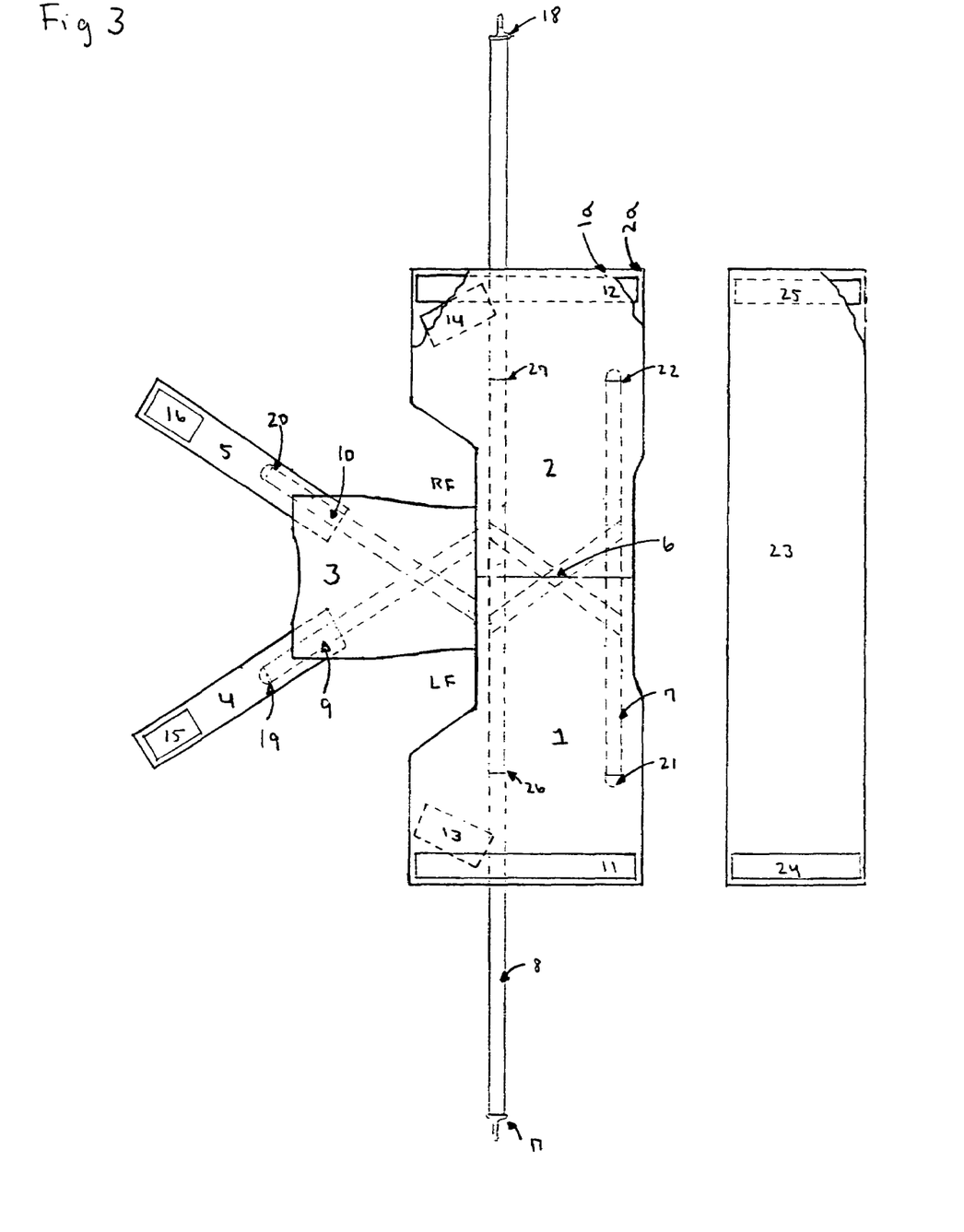
FIG. 3 diagrams the preferred embodiment of the vest lying flat inside-up.

FIG. 3 illustrates how a vest is assembled first by sewing the inner lining (1a) body support portion right (2) and left (1) side sections, then attaching the chest support portion or section (3). The inner lining is made of soft, breathable cotton quilting. The same process is followed for the outer lining (2a), which is made of a strong, lightweight, breathable fabric like Twill, Linen, Muslin, Denier Nylon, or Cordura. The inner lining vest is sewn to the outer lining with a soft binding made of cotton, cotton blend, or PolarFleece™. The detachable cold weather lining 23 is just one continuous piece of Wool, synthetic wool, or PolarFleece™. The inner lining of the two shoulder straps (4) (5) are sewn to their respective outer lining of the shoulder straps with the same soft binding used on the vest body. The shoulder straps (4) (5) are then sewn to the vest chest portion (3).

Figure 3A:
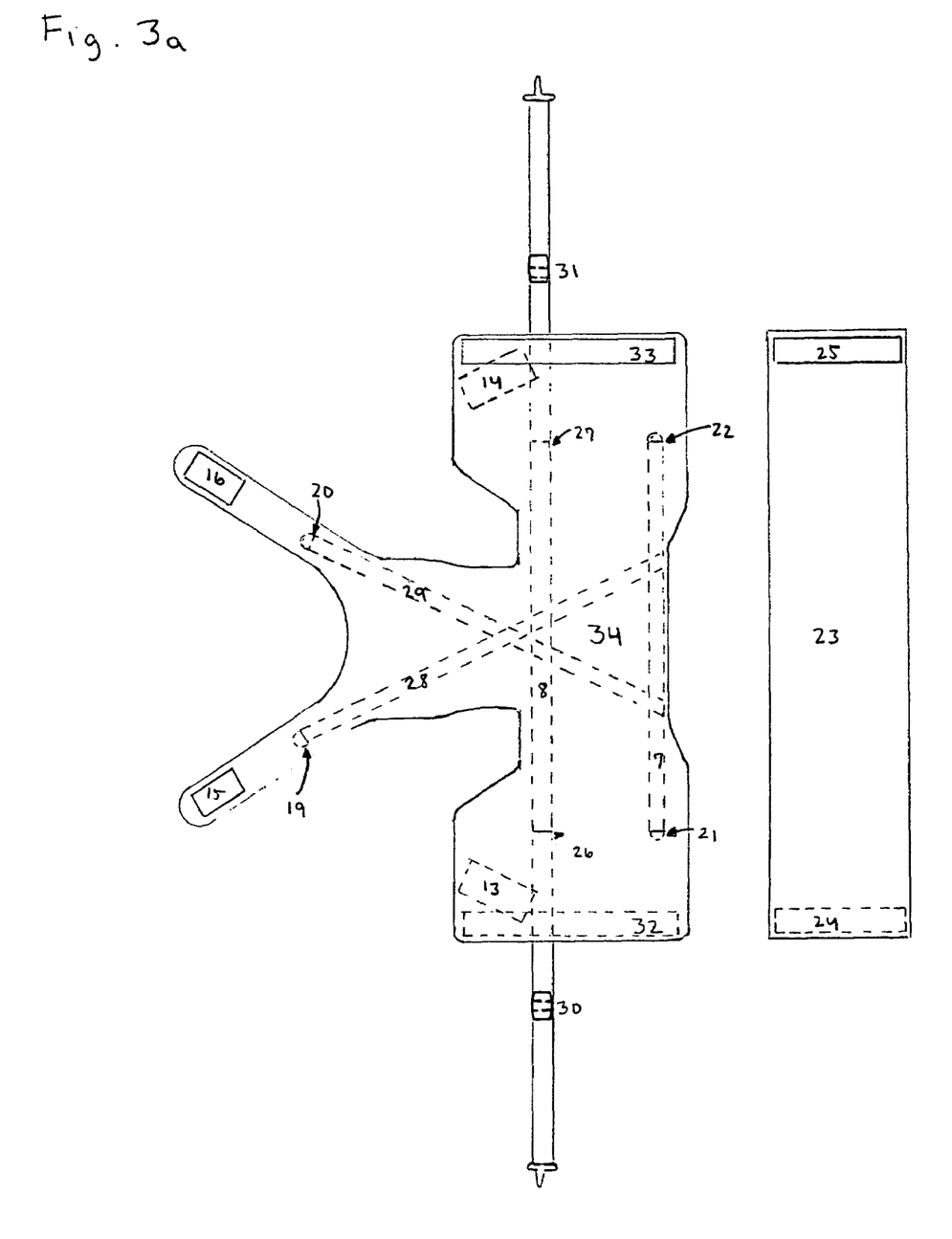
FIG. 3a diagrams another manufacturing embodiment of the vest lying flat inside-up.

FIG. 3a shows that the improved manufacturing method is to cut out the inner lining and outer lining at the same time on a fold of material and all in one piece (34) to save on labor costs, which also adds additional integrity to the vest. The two layers are then surged together right sides out and then binding is applied along the outside with rounded corners.

FIG. 3 shows how the hook side of the connecting Velcro, RTM is sewn right side (12) and the loop side is sewn to the left (11) to secure the side sections at the top line of the vest or animal. FIG. 3a illustrates how the device will cater to the majority of right handed owners that will most likely stand to the left side of the dog. The hook side of the connecting Velcro, RTM can be sewn to the left side (32) and the loop side sewn to the right (33). FIG. 3 similarly illustrates how the loopside of the Velcro, RTM is sewn to the end of shoulder straps (15) (16) and the hook side is sewn to the front of the side sections (13) (14).

FIG. 3a demonstrates improved manufacturing methods by cutting the vest out in one piece (34) with rounded corners as opposed to five pieces (1), (2), (3), (4), (5) as shown in FIG. 3; right handed accommodation for top-line Velcro (32) (33); and one cross bracing (28) (29) as opposed to two separate bracings (9) (10) (6) as shown in FIG. 3. In order to allow for more adjustability, a heavy-duty plastic tension-lock buckle (30) (31) is added to each side of the front webbing strap handle (8).

The garment is now a wearable vest ready to add the supporting straps and handles. (It is to be understood that the vest without the handles could be worn by an animal simply as a cold weather vest.) The material used for the strapping is either nylon or polypropylene webbing. First, the chest straps are sewn with the right strap (9) crossing over or under the left (10), ending on the shoulder strap with a cast D-Ring (19) (20). Then, the cross bracing is sewn (6) to the undercarriage. FIG. 3a shows how the labor saving manufacturing method is to extend the chest webbing straps (28) (29) back to the rear (7) strap to serve also as the underbracing. The rear strap (7) and front strap (8) are sewn over the cross bracing. The sewing of the front and rear straps end at the same point; however, the rear straps are finished with cast D-rings (21) (22) and the front straps are longer, continuing unattached and finished with snaps (17) (18). Additionally, all webbing ends, webbing hardware connections, or Velcro, RTM ends are secured with 1¼ inch sewn 'x' boxes for strength. All hardware is strong enough to handle the entire weight of the animal.

The additional cold weather lining is made on one continues piece of woolen material (23) or PolarFleece™ and the hook side of the connecting Velcro, RTM is sewn right side (25) and the loop side is sewn to the left (24) to secure the side sections at the top line. This garment is not sewn to the vest so that it can be worn only as needed.

FIG. 3 illustrates the desired position of the canine for easy installation of the vest. The first step is to place the vest inside up under the dog with the dog's forelegs in position "LF" and "RF". Second, pull the left (1) and right (2) side sections together, fastening the Velcro. RTM strips (11) (12) on the dog's top line. The third step includes pulling the chest section (3) by front shoulder straps (4) (5) through the front legs and securing the shoulder straps to the already secured side sections by connecting the Velcro, RTM patches (15) to (13) and (16) to (14) on either side of the neck. The last step is to cross the front strap handles (8) and connect to the shoulder D-rings (17) to (20) and (18) to (19) or rear D-rings (17) to (22) and (18) to (21), depending on the anticipated use. Using the shoulder strap position (9) (10) provides support for going downstairs, and the rear strap (7) position with the extra undercarriage cross bracing (6) provides support through the whole ribcage for going upstairs, walking and standing support. The extra cold weather lining (23) can be secured prior to the vest by sliding it under the dog's rib cage inside up and connecting the Velcro, RTM strips on the top line together (25) to (24).

DESCRIPTION OF OTHER EMBODIMENTS

Figure 4:
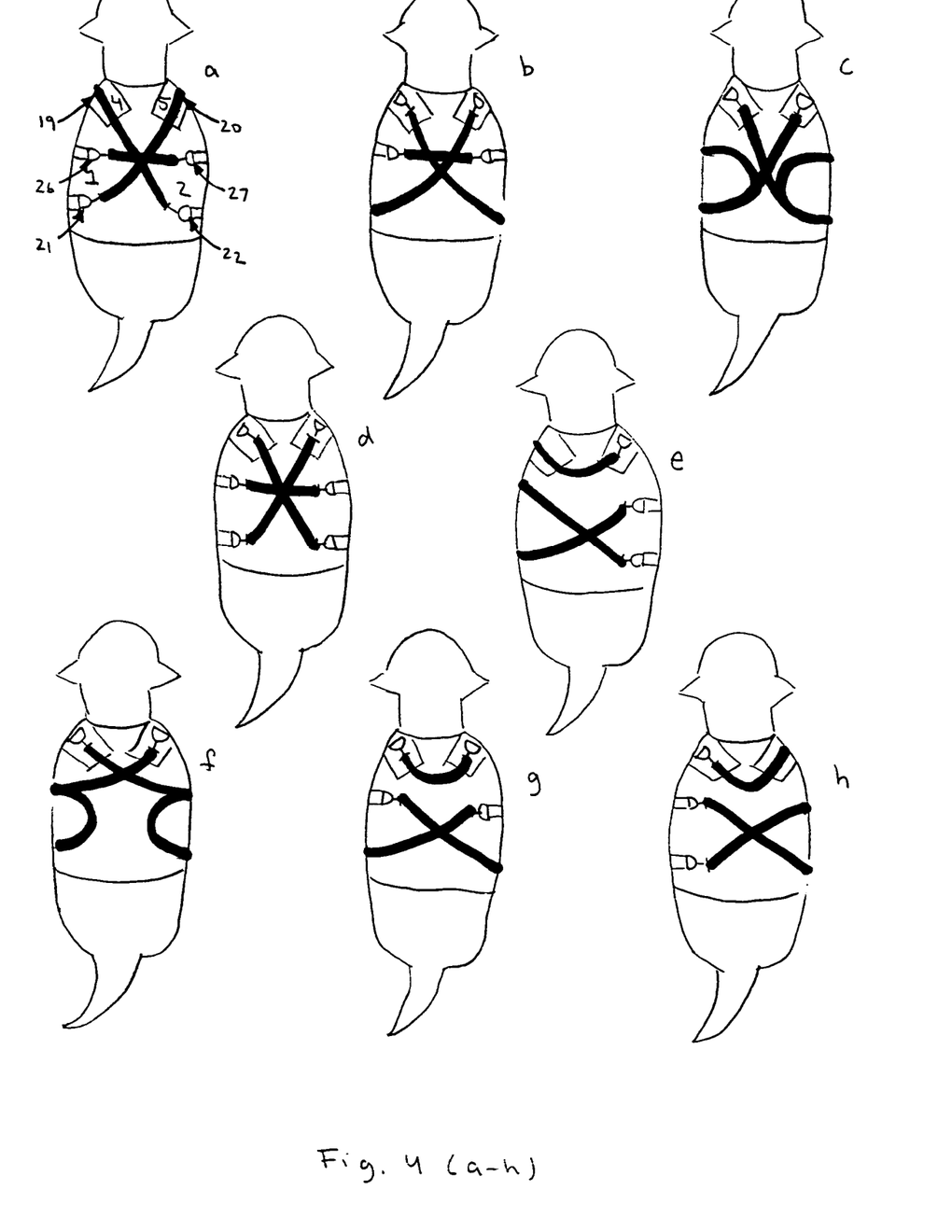

There are numerous handle configurations as shown in FIG. 4 that may be customized to handler preference. There are three sets of right and left connection points, as shown in FIGS. 4a-4p, which includes the shoulder (19) (20), and rear (21) (22) and the front (26) (27) where the sewing ends on the front strap (8). FIG. 4 diagrams several alternative handle configurations, but not all possible. The straps can be completely detachable, having snaps on both ends (4d) (4o), semi-detachable sewn to the vest on one end and having a snap on the other (4e) (4h) (4k), or permanent being sewn on both ends (4c) (4j).

The preferred hardware for connecting the handles includes heavy duty metal snaps and cast metal D-rings to receive the snaps. Alternatives include buckles and holes in the webbing to receive the buckles, or using bolt snaps instead of snaps. Plastic hardware is only usable if the plastic is rated to carry the entire weight of the dog.

The preferred embodiment includes adjustable handles by adding 8 to 16 inches of webbing to the front (8) straps and winding it back through a heavy duty plastic tension-lock buckle (30) (31) or jam lever buckle that can withstand loads over 200 pounds, although custom lengths, can be manufactured. The preferred embodiment uses nylon and polypropylene webbing for the straps, but other strong material like leather could be used. The preferred embodiment uses a one inch webbing but wider webbing can be used.

The size of the vest is completely customizable to any size dog. The pattern size shown in FIG. 3 is for an 80-85 pound Labrador with a wide chest. The long-narrow narrow chested dog requires the same girth circumference and shoulder strap angle, with the exception that the chest section (3) is longer, narrower, and almost straight without the curves. The narrow chested dog also tends to be longer in the front shoulder so the curves of the side sections (1) (2) near the attachment points (13) (14) become more pronounced.

The vest material could be substituted provided that the outer lining is strong and rip-stop and the inner lining is comfortable to the dog. The recommended vest fastener is one and one-half inches to two inches sewn-on Velcro, RTM; however, a zipper could also be used.

The preferred embodiment of the present invention has been described. With the foregoing description in mind, however, it is understood that this description is made only by way of example, that the invention is not limited to the particular embodiment described herein, and that various rearrangements, modifications, and substitutions may be implemented without departing from the true spirit of the invention as hereinafter claimed.

What is claimed is:

1. An activity vest for a quadruped animal, comprising:
    a body support portion configured to the underbody of the animal between the four legs of the animal, wherein the body support portion comprises:
        a left side having an interior and an exterior; and
        a right side having an interior and an exterior;
        a first closure device attached to either the interior or the exterior of the left side of the body support portion;
        a second closure device attached to either the interior or the exterior of the right side of the body support portion, wherein the first closure device is configured to be coupled to the second closure device along a top line of the animal when the activity vest is placed upon the animal;
        a first fastening member attached to the exterior of the left side;
        a second fastening member attached to the exterior of the right side;
        a front strap having a first end and a second end, wherein the front strap is at least partially attached to the exterior of the left side and the exterior of the right side;
        a rear strap having a first end and a second end, wherein the rear strap is at least partially attached to the exterior of the left side and the exterior of the right side, wherein the front strap, relative to the rear strap, is positioned nearer to the front legs of the animal when the activity vest is worn by the animal, and wherein the front strap has a greater length than the rear strap;
        a first snapping member coupled to the first end of the front strap;
        a second snapping member coupled to the second end of the front strap;
        a first connecting member coupled to the first end of the rear strap; and
        a second connecting member coupled to the second end of the rear strap;
    a chest support portion secured forwardly of the body support portion to support the chest of the animal in front of the two front legs of the animal;
    a first strap member having a first end, a second end, an interior, and an exterior; and
    a second strap member having a first end, a second end, an interior, and an exterior, wherein the interiors of the first and second strap members corresponds to the interior of the body support portion, the first ends of the first and second strap members are coupled to the chest support portion, third and fourth fastening members are coupled to the interiors of the first and second strap members at the second ends of the first and second strap members, respectively, wherein the third and fourth fastening members are configured to be coupled to the first and second fastening members, respectively, when the vest is placed upon the animal;
    a first bracing member that is attached to the chest support portion and extends from under the chest support portion along the first strap member; and
    a second bracing member that is attached to the chest support portion and extends from under the chest support portion along the second strap member, wherein the first bracing member and the second bracing member intersect, the first bracing member having a third connecting member coupled thereto and the second bracing member having a fourth connecting member coupled thereto, wherein the first and second snapping members are connectable to any of the first, second, third, or fourth connecting members, to act as handles.

* * * * *